United States Patent [19]

Atumi et al.

[11] 3,972,052

[45] July 27, 1976

[54] COMPENSATION APPARATUS FOR HIGH SPEED DOT PRINTER

[75] Inventors: Shiro Atumi, Mitaka; Kozo Yamada, Hachioji, both of Japan

[73] Assignee: Oki Electric Industry Company, Ltd., Tokyo, Japan

[22] Filed: Oct. 24, 1973

[21] Appl. No.: 409,289

[30] Foreign Application Priority Data

Dec. 28, 1972 Japan .............................. 47-130205
Oct. 24, 1972 Japan .............................. 47-105834

[52] U.S. Cl. ........................................ 337; 197/1 R

[51] Int. Cl.[2] ........................................ G01D 15/18

[58] Field of Search ........... 197/1 R; 101/1 R, 93 C; 346/75, 1 R, 140; 178/18–20, 23, 30; 340/324 Q

[56] References Cited

UNITED STATES PATENTS

| | | | |
|---|---|---|---|
| 3,136,594 | 6/1964 | Ascoli | 346/1 |
| 3,298,030 | 1/1967 | Lewis et al. | 346/75 |
| 3,370,297 | 2/1968 | Burton | 346/75 |
| 3,476,874 | 11/1969 | Loughren | 346/75 |
| 3,484,794 | 12/1969 | Winston | 346/75 |
| 3,488,664 | 1/1970 | Winston | 346/75 |
| 3,500,436 | 3/1970 | Nordin | 346/75 |
| 3,510,878 | 5/1970 | Johnson, Jr. | 346/1 |
| 3,512,173 | 5/1970 | Damouth | 346/75 |
| 3,562,761 | 2/1971 | Stone et al. | 346/75 |
| 3,579,245 | 5/1971 | Berry | 346/1 |
| 3,596,276 | 7/1971 | Lovelady et al. | 346/1 |
| 3,631,511 | 12/1971 | Keur | 346/75 |
| 3,688,034 | 8/1972 | Kashio | 178/30 |
| 3,689,936 | 9/1972 | Dunlavey | 346/75 |
| 3,691,551 | 9/1972 | Kashio | 340/324 A |
| 3,769,624 | 10/1973 | Lee et al. | 346/1 |
| 3,769,627 | 10/1973 | Stone | 346/75 |
| 3,769,630 | 10/1973 | Hill et al. | 346/75 |
| 3,769,632 | 10/1973 | Julisburger | 346/75 |

OTHER PUBLICATIONS

IBM Tech. Discl. Bul. vol. 16 No. 3, 8/73 pp. 773–774, "Horizontal Ink Stream Deflection etc."

IBM Tech. Discl. Bul. vol. 16 No. 3 8/73 pp. 778–779 "Binary Drop Breakoff Synchronization."

IBM Tech. Discl. Bul. vol. 14 No. 9 2/72 p. 2796, "Variable Delay for Ink Jet Printer."

IBM Tech. Discl. Bul. vol. 16. No. 4 9/73 p. 1096 "Selective Charging of Drops in E.S. Ink Jet Stream."

*Primary Examiner*—Edgar S. Burr
*Assistant Examiner*—Edward M. Goven
*Attorney, Agent, or Firm*—Peter L. Berger

[57] ABSTRACT

Printing apparatus which blows ink drops to the surface of the printing paper so that contours formed by the ink drops are letters, numerical figures and other symbols. A time delay is employed in charging the ink drops to be deposited, depending upon whether ink drops are to be successively or non-successively deposited upon the medium upon which printing takes place. By delaying the charging, compensation for the differences in deflection angle due to the pneumatic resistance and Coulomb force repulsion between successive and nonsuccessive dot deposition is effected.

5 Claims, 21 Drawing Figures

COMPENSATION APPARATUS FOR HIGH SPEED DOT PRINTER

BACKGROUND OF THE INVENTION

A typical printer of this kind which has been known may consist of feeding ink to a nozzle, applying a very small pressure so that the ink may assume a semicircular form at the tip of the nozzle, establishing an electric field between an acceleration electrode positioned several millimeters in front of the nozzle and the nozzle in order to draw the ink in droplet form, applying an intense electric field between the nozzle and the platen to run the ink drops toward the surface of the printing paper, electrostatically deflecting the ink drops in both the main and sub directions like a cathode ray tube display thereby controlling the position on the printing paper surface to which the ink droplets will be directed in order to print the letters and signs.

Another known typical ink-jet printer consists of feeding ink to the nozzle with a relatively high pressure to blow the ink stream from the nozzle, applying an electric field of an intensity corresponding to the position in the main scanning direction on the printing paper surface to the space between the charging electrode placed at a position where the ink stream divides itself into ink droplets and the nozzle in order to selectively charge the ink droplets and to cause the charged ink droplets to be deflected in the main scanning direction, and moving the printing head at a definite speed and continuously in the subscanning direction to print the letters and signs successively.

The above-mentioned two types are different in regard to their objects that will be controlled according to letter pattern information, and depending on their objects; the former is known as the electric field control type, and the latter the charge control type.

Concerning the electric field control type printers, since it is allowed to fix the relation between the printer head and the printing paper at least during the printing of a letter is fixed, it is desirable to provide a mechanism that intermittently feeds the printer head, such as a typewriter, punching typewriter, or a telegraph printing mechanism. But such printers require the application of a voltage as high as about 10,000 volts. Also for the purpose that the electric field established between a pair of electrostatic deflection plates may cause deflection of the desired ink drops only, the length of the electrostatic deflection plates along the ink drop running direction has to be nearly equal to, or less than, the distance between the ink droplets; hence speeding up the formation of ink drops merely results in the degraded deflection sensitivity.

As for the charge control type printers, the application of a d-c voltage to the electrostatic deflection plate pair provides an advantage in that the deflection sensitivity can be set independently of the ink drop formation rate. But in such printers, since the displacement of ink drops in the lateral direction depends on the movement of the printer head and, tracing performance of the printer head at the time of starting and stopping had always provided problems for the printers interlocked to the key devices.

It is therefore an object of this invention to provide a printer which can feed the printer head either continuously or intermittently by the employment of a printer-head feeding mechanism.

Another object of this invention is to provide an improved printer having increased deflection sensitivity.

Still another object of this invention is to provide a printer which develops reduced printing distortion.

Yet another object of this invention is to provide an improved printer which features increased printing speed when the printer head is being fed continuously.

In the Invention:

Also, in some form of the invention, distortion might develop on a small portion of the letter printed, but by varying the phase of the voltage pulses applied to the charging electrode according to the mode of letter pattern information, distortion of the letter printed can be reduced.

DETAILED DESCRIPTION OF THE INVENTION

Figure 1:
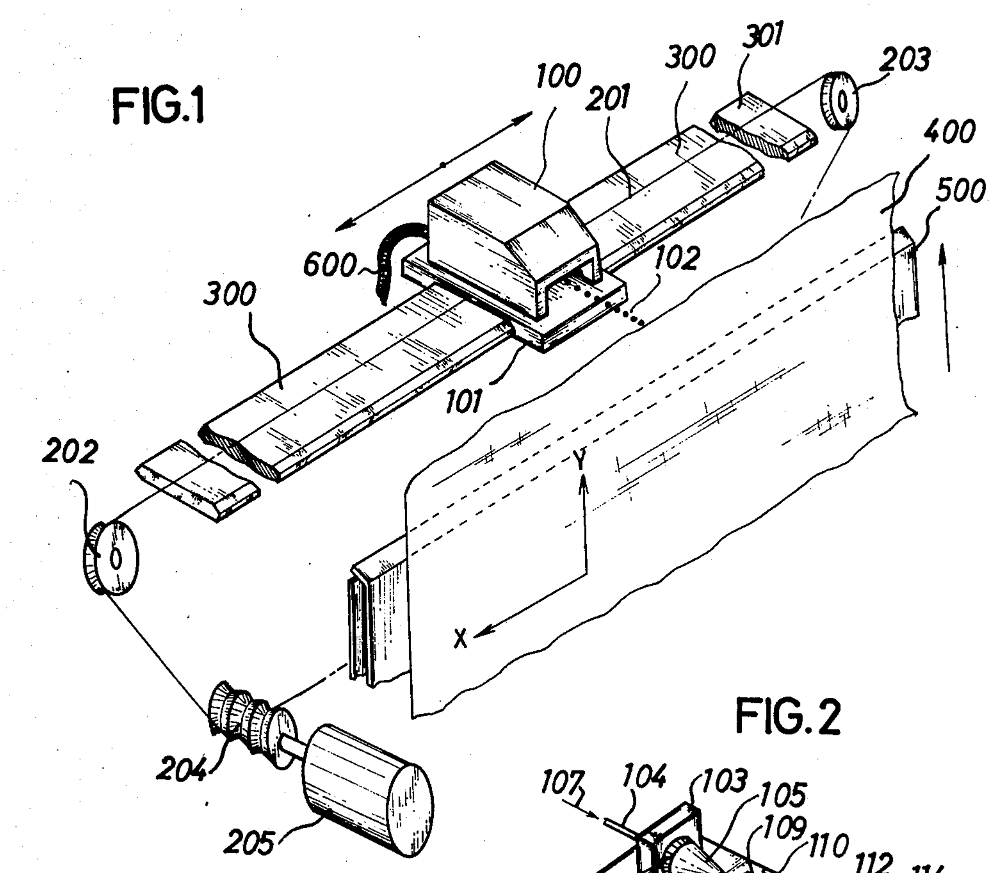
FIG. 1 is a schematic view showing an example of the printing part of the ink-jet printer according to this invention.

Referring to FIG. 1, numeral 100 represents a printer head with its bed 101 being fastened with wire 201 at the right and left sides. The wire 201 is connected to a drive pulley 204 via pulleys 202 and 203 and is tensioned in an endless manner. The shaft of the drive pulley 204 is directly coupled to a rotary shaft of the servo motor 205. The drive pulley 204 is rotated by the rotation of the servo motor 205, so that the wire 201 is moved right or left to move the printer head 100 on a guide rail 300 toward the right or left.

An ink-drop train 102 injected from the printer head 100 does not reach printing paper 400. The printer head 100 being moved intermittently on the guide rail 300 as mentioned above, performs a line of printing on the printing paper 400 in the lateral direction X. After a line of recording has finished, the printing head 100 is returned to the initial point 301 at the left end from a facing the paper direction, and the printing paper 400 is transferred for the next line by an ordinary paper-feed mechanism (not shown). Numeral 600 is a cable guide for feeding electric signals to the printer head 100.

Figure 2:
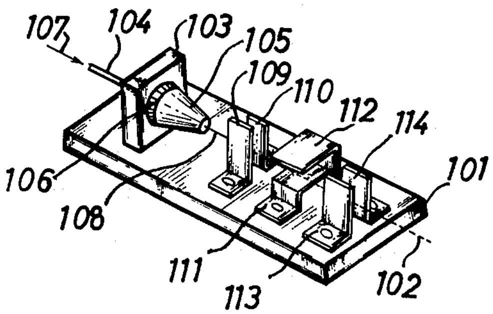
FIG. 2 is a perspective view showing the setup of the printer head of FIG. 1.

Referring to FIG. 2, numeral 103 stands for a nozzle holding bed behind which is penetrating an ink tube 104 to connect to a nozzle 105. Nozzle 105 is of a horn shape and has a small aperture at the center. Numeral 106 is a cylindrical piezo-electric element and is firmly held to the nozzle 105. An electric conductive ink is used; the ink 107 is supplied with pressure from the pump system (not shown) through the ink tube 104, and an ink stream 108 is ejected from the tip of the horn-shaped nozzle 105. Due to the vibration caused by the piezo-electric element 106, the ink stream 108 is caused to split itself into an ink-drop train 102. Numerals 109 and 110 are charging electrodes being disposed on the horizontal plane X and to the right and left sides with respect to the ink stream 108, and electrically consist of a single electrode plate. Numerals 111 and 112 are the main electrostatic deflection plate pair, and are positioned above and below on the vertical plane Y with respect to the ink-drop train 102. Numerals 113 and 114 are a subelectrostatic deflection plate pair, and are positioned to the right and left on the horizontal plane X with respect to the ink-drop train 102. Nozzle 105, charging electrodes 109 and 110, and deflection plates 111–114 are all attached to the head bed 101.

Figure 3:
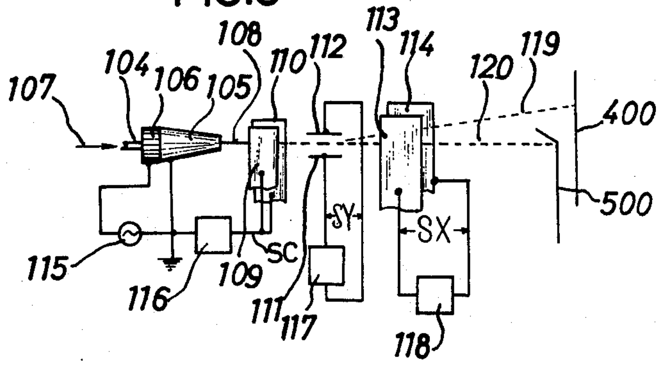
FIG. 3 is a schematic diagram of the ink-jet printer shown in FIG. 1.

Referring now to FIG. 3, the nozzle 105 is connected to the reference potential, and the piezo-electric element 106 is energized with a pulse voltage CP of a definite frequency from the nozzle driving source 115. The nozzle 106 is vibrated to transmit its vibration to the tip of the nozzle 105. Ink 107, as mentioned above, is supplied being pressurized through the ink tube 104, and is ejected as an ink stream 108 from the horn tip.

At this moment, a regular wave is induced in the ink stream 108 due to the vibration at the nozzle tip; the wave is gradually amplified through the ink stream 108, and when the amplitude becomes equal to the diameter of the ink stream 108, the ink stream 108 is caused to split itself into ink-drop train 102. The ink-drop train 102, in synchronism with the vibration frequency of the nozzle 105, is formed maintaining equal distance and in a uniform size. The charging electrodes 109, 110 being positioned over the areas where the ink stream 108 splits into ink-drop train 102, are served across itself and the nozzle 105 with a pulse voltage *Sc* of a definite amplitude by the charging voltage source 116 in synchronism with the formation of ink-drop train 102, in order to selectively charge the ink drops 102. Ink-drop train 102 passes through the main and sub-electrostatic deflection plate pairs 111–114, each of which has been applied with deflection voltages $S_Y$ and $S_X$ by the main deflection voltage source 117 and the sub-deflection voltage source 118, so that the charged ink-drop train 119 is electrostatically deflected in the vertical Y and horizontal X directions. The ink drops pass over an ink-drop capturing means 500 and reach the printing paper 400 to effect printing. The uncharged ink-drop train 120 undergoes no deflection and proceeds straight to be recovered by the ink capturing means 500.

Figure 4:
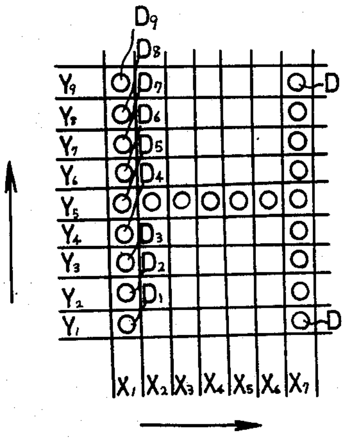
FIG. 4 is a diagram showing the pattern of an example of letters recorded by this invention.

FIG. 4 shows a letter formed by the main scanning direction, i.e., dot trains $Y_1$–$Y_9$ in the vertical direction Y, and by subscanning direction, i.e., dot lines $X_1$–$X_7$ in the horizontal direction X. Arrows in the Figure indicate the scanning directions. In this instance, since the letters, numerical figures and signs are printed by electrically scanning the letter in the vertical and horizontal directions Y and X, the head is stationary with respect to the printing paper 400, while the letters, numerical figures or signs are being printed.

Figure 5:
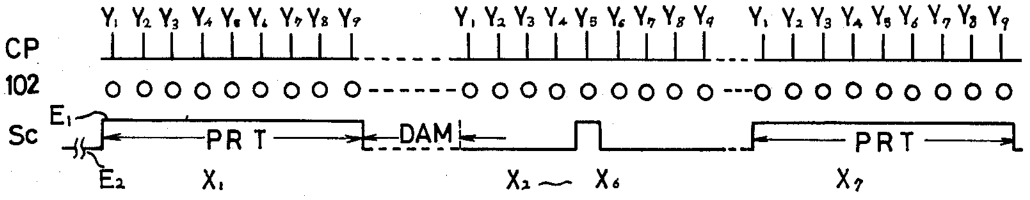
FIG. 5 is a diagram showing the time relation between the nozzle driving period CP and the charging voltage wave form Sc.

FIG. 5 shows the relation among a pulse voltage CP applied to the piezo-electric element 106, charging voltate *Sc* applied to the charging electrodes 109, 110 and the timing of ink-drop formation, by referring to the case shown in FIG. 4 where the letter H is printed. Signs of dot lines $Y_1$–$Y_9$ responsive to the letter H are attached to represent the pulse voltage CP, and the signs of dot trains $X_1$–$X_7$ are attached to represent the charging voltage *Sc*.

Referring now to FIGS. 4 and 5, at the left end dot train $X_1$ of the letter pattern that will be printed, D have been printed throughout all dot lines $Y_1$–$Y_9$; hence while nine ink drops, $D_1$–$D_9$ are being formed, the charging voltage will assume a potential $E_1$ representing 1 of the binary notation.

On the dot trains $X_2$–$X_6$, the dots D will be printed only on the dot line $Y_5$; hence the charging voltage *Sc* will assume 1 of binary notation at the timing corresponding thereto.

For the timing of forming ink drops 102 that do not contribute to the printing and will be recovered by the ink capturing means 500, the charging voltage is at the ground level equal to the earth potential $E_2$.

Referring to the charging voltage *Sc*, there are periods to control the charging amount of nine ink drops $D_1$–$D_9$ corresponding to the dot trains $X_1$–$X_7$ as shown in FIG. 4, and periods which do not directly contribute to the printing of the pattern of the letter; the former is called printing periods PRT, and the latter the dummy periods DAM.

Figure 6:
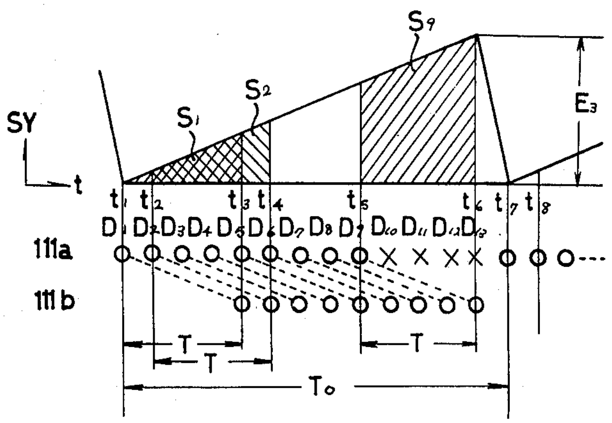
FIG. 6 is a diagram showing the relation between the main electrostatic deflection voltage $S_Y$ and the ink drop.

Next, referring to FIG. 6, the numeral 111*a* represents the position of inlet of the main electrostatic deflection plate pair 111 and 112, and 111*b* represents the position of outlet of the main electrostatic deflection plate pair 111 and 112. Hence, for example, where the main deflection voltage $S_Y$ is $E_3$, the ink drop $D_5$ at time $t_3$ will enter the main electrostatic deflection plate pair 111 and 112. In FIG. 6, at time $t_1$, the first ink drop $D_1$ of the dot train $X_1$ will first enter to the deflection plate pair 111 and 112. If now the time required for an ink drop passing through the deflection plate pair as will be determined by the length of the deflection plate pair 111, 112 along the drop proceeding direction and the speed of the ink drop passing is denoted by T, then the first ink drop $D_1$ will come out of the deflection plate pair 111, 112 at time $t_3$. Since the deflection amount that will be given to the first drop $D_1$ will be approximately proportional to the time integration of the deflection voltage across the deflection plate pair, the first ink drop $D_1$ will receive the force of deflection proportional to the area $S_1$ shown in FIG. 6. Similarly, the second ink drop $D_2$ which enters at time $t_2$ and comes out at time $t_4$ will receive the deflection proportional to the area $S_2$ of FIG. 6. The same holds true for other ink drops $D_3$–$D_9$. For example the ninth ink drop $D_9$ which enters at time $t_5$ and comes out at time $t_6$ will receive the deflection proportional to the area $S_9$. The saw-tooth wave is returned to the initial form at time $t_7$ and is transferred to the printing of the next dot train $X_2$. While the ninth drop $D_9$ has entered the deflection plate pair 111 and 112 and is passing therethrough, i.e., the ink drops entering to the deflection plate pair 111, 112 during the time $t_5$–$t_7$ of FIG. 5 are not used for printing; such uncharged drops are the dummy drops which account for the necessity of dummy period DAM. The areas $S_1$, $S_2$ - - - $S_9$ increase in the manner of arithmetical series and account for the deflection in the required main scanning direction. The size of the letter recorded in the vertical direction is proportional to the difference in deflection amount between the first drop $D_1$ and the ninth drop $D_9$, and is given by the difference obtained by subtracting area $S_1$ from area $S_9$ of FIG. 6. The area $S_1$ is also common for all ink drops and gives the amount by which the ink drops pass over the ink capturing means 500. As mentioned above, the deflecting method according to this invention requires the following two essential conditions: (1) to appropriately set the timing of printing drops of one dot train, e.g., $D_1$–$D_9$, which are entering to the deflection plate pair 111, 112, and to set the repeating phase of the main deflection voltage $S_y$, and (2) to confine the time required for the dot train, e.g., the time required from the first drop $D_1$ entering to the deflection plate pair 111, 112 up to the final drop $D_9$ coming out of the deflection plate pair 111, 112, within the sweeping period of the main deflection voltage. But by introducing a dummy period DAM, for example, dummy drops $D_{10}$–$D_{13}$, a considerable amount of deflection can be obtained.

Figure 7:
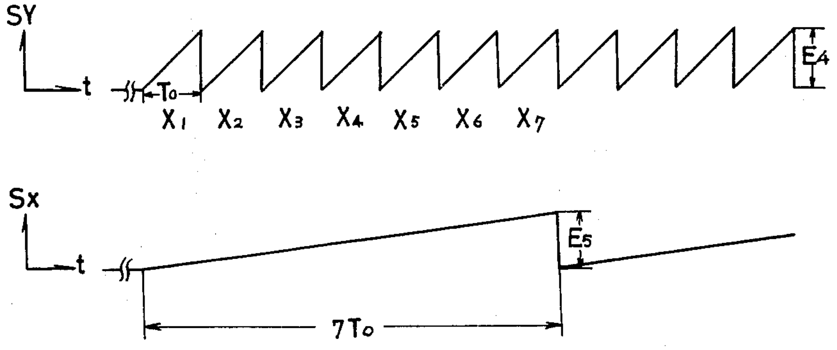
FIG. 7 is a diagram showing relation between the main electrostatic deflection voltage $S_Y$ and the sub-electrostatic deflection voltage $S_X$.

The main electrostatic deflection signal $S_Y$ is of a saw-tooth wave of a period $T_0$ and peak value $E_4$, as shown in FIG. 7. The sub-electrostatic deflection voltage $S_X$ is of a saw-tooth wave of a period as long as $7T_0$ and peak value $E_5$. The reason why the period of the sub-electrostatic deflection voltage $S_X$ is 7 times to results from the dot train, i.e., seven rows $X_1$–$X_7$, as shown in FIG. 7. Deflecting method in the sub-deflecting direction is similar to the main deflecting method; it is necessary to make the length of the deflection plate pair 113, 114 along the drop running direction nearly equal to the length along the main scanning direction. The peak values $E_4$ and $E_5$ of the deflection voltages $S_Y$ and $S_X$ are determined by the size of the letter in the vertical and horizontal directions, i.e., by the deflection sensitivity. In an embodiment of this invention, since the saw-tooth wave is used for the sub-deflection direction, the letters recorded will be somewhat aslant. Also, as for the phase between the deflection voltage $S_Y$ and the deflection voltage $S_X$, correction is needed by the amount equal to the time lag from the time at which ink-drop train 102 has entered to the main electrostatic deflection plate pair 111, 112 to the time at which the same ink-drop train has entered the sub-electrostatic deflection plate pair 113, 114.

Figure 8:
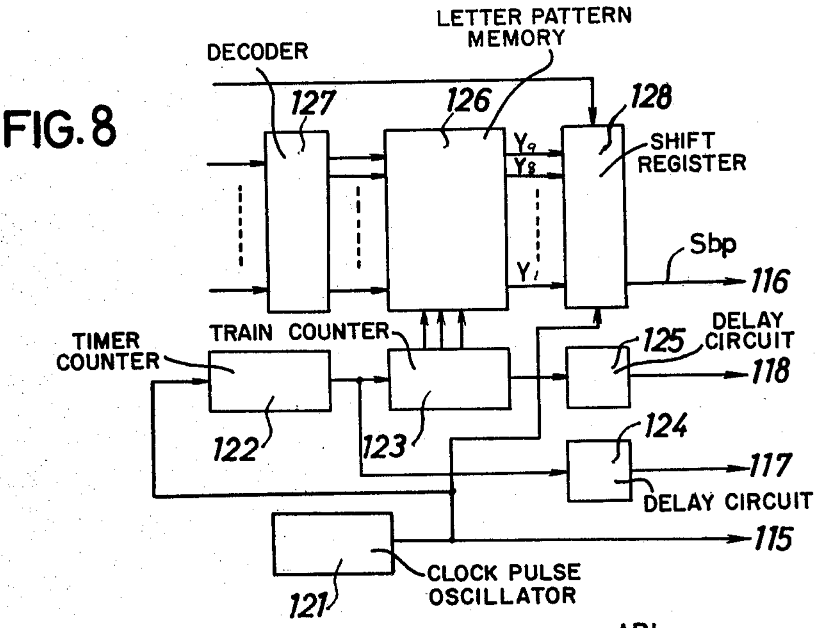
FIG. 8 is a block diagram of the control system to obtain electrical signals which will be applied to the printer head.
Figure 13:
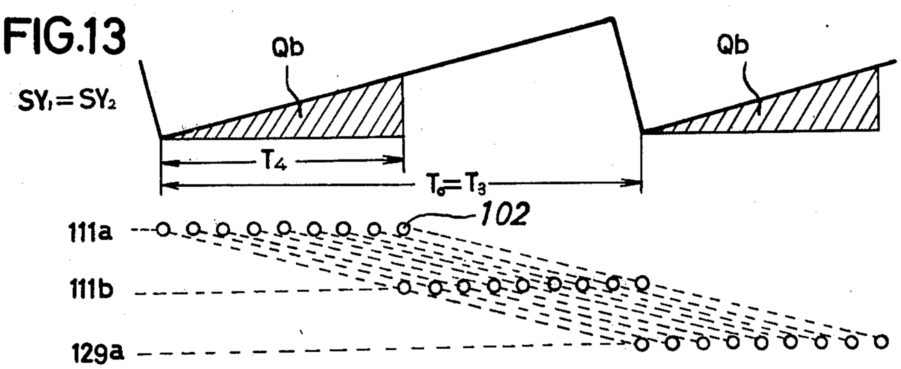

The control circuit to control the electric circuits is as shown in FIG. 8. Numeral 121 is a clock pulse oscillator, at which frequency the nozzle driving source 115 will be operated. Numeral 122 is a 4-bit duorinary (numerical base of 13) line counter to count the number of ink drops contained in one cycle of the main deflection voltage $S_Y$ inclusive of the ink drops $D_{10}$–$D_{13}$ during the dummy period DAM of FIGS. 3 and 6. Numeral 123 is a train counter to count the number of dot trains of letter pattern; a 3-bit heptanary (numerical base of 7) counter is used because the letter in FIG. 13 is formed of seven dot-lines $X_1$–$X_7$. The carry of a line counter 122 is put into the main scanning phase delay circuit 124 and is delayed by an appropriate amount to be given as a timing signal to the main deflection voltage source 117. The carry of the train counter 123 is put into a sub-scanning phase delay circuit 125 and is delayed by an appropriate amount to be given as a timing signal to the sub-deflection voltage source 118. The phase delay circuits 124 and 125 are to correct the time lag from the time at which the ink drop 102 is charged to the time at which the same drop reaches the main and the sub-deflection plate pairs 111–114, as mentioned above. Hence the delay times can be varied according to the speed of the ink drop 102. The output of each bit from the train counter is given to a letter pattern memory 126 as a dot train selection signal of letter pattern. The letter input signals that will be printed are put into a decoder 127 in the form of letter codes. The decoder 127 reads the letters, produces signals to specify particular portions of the letter pattern memory, and specifies a letter. According to line selection signals, the information of one dot train of letters, etc., that will be printed is set in parallel in the shift register 128. Simultaneously with the letter code, the printing command is given as a reset releasing signal to the shift register 128. The shift register 128 is shifted in synchronism with the clock pulse of the clock pulse oscillator 121 to produce its output sequentially and in series. Also, while the printing command is not being given, the shift register 128 is reset and no charging signal *Sc* is produced.

Figure 9:
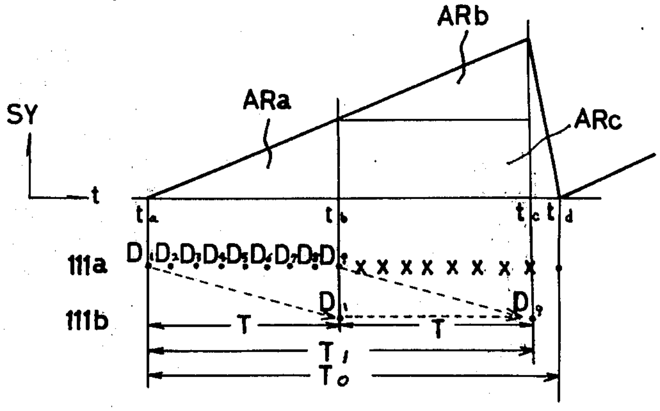
FIG. 9 is a diagram showing the relation between the main electrostatic deflection voltage $S_Y$ and the ink drop for obtaining maximum deflection under the condition that the amplitude of the deflection voltage remains constant.

Next, if now the scanning period from which is subtracted a flyback time within the period $T_0$ is denoted by $T_1$ with the main deflection voltage $S_Y$, the first drop $D_1$ enters to the deflection plate at time $t_a$ and comes out at time $t_b$, and the ninth drop $D_9$ enters at time $t_b$ and comes out at time $t_c$, as shown in FIG. 9, in order that the ink-drop speed is set to $T=\frac{1}{2} \times T_1$. The area to give deflection to the first drop $D_1$ is denoted by $AR_a$, and the area to give deflection to the ninth drop $D_9$ is $(AR_b + AR_c)$, where $AR_a=AR_b$; hence the difference $AR_c$ represents displacement giving a maximum of deflection. In such a case, the ink drops entering to the deflection plate pair during time $t_b$ to $t_d$ turn into dummy drops.

As for the sub-electrostatic deflection plate pair 113, 114, a maximal deflection condition can be obtained by making the length of the sub-electrostatic deflection plates equal to the length of the main electrostatic deflection plate pair 111, 112, and the amplitude of the deflection voltage can be reduced.

Also, where a larger deflection is required with the peak amplitude of the deflection voltages $S_Y$, $S_X$ being constant, many main or sub-electrostatic deflection plate pairs may be provided to meet the requirement thereby applying a deflection voltage of the phase determined by taking into account the distance between a plurality of deflection plate pairs.

Figure 10:
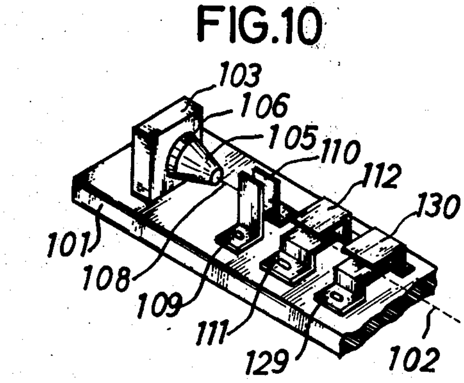
FIG. 10 is a schematic perspective view showing another example of the printer head used in an embodiment of this invention.
Figure 11:
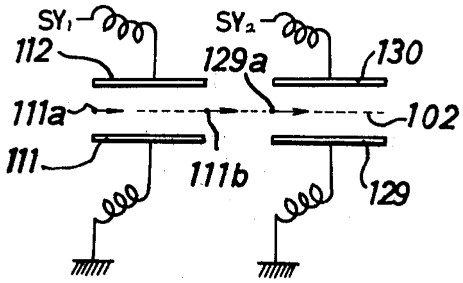
FIG. 11 is a diagram showing the condition in which ink drop is passing through the deflection plates.

Furthermore, where it is intended to obtain greater deflection, the following method may be employed. That is, by referring to FIGS. 10 and 11, if now the time required by an ink drop 102 to pass through the distance from the inlet 111*a* of the first main electrostatic deflection plate pair 111, 112 to the inlet 129*a* of the second main electrostatic deflection plate pair 129, 130, is denoted by $T_2$, a deflection voltage $S_{Y2}$ of which time being delayed by $T_2$ behind the deflection voltage $S_{Y1}$ of the main electrostatic plate pair 111, 112 may be applied to the second main electrostatic deflection plate pair 129, 130 as shown in FIG. 12.

Figure 12:
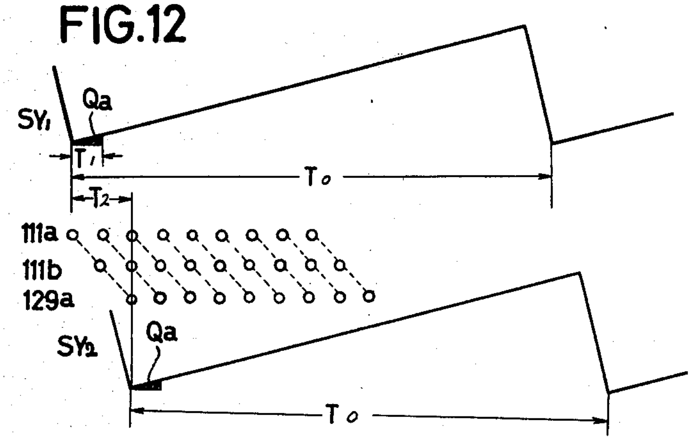
FIGS. 12 and 13 are diagrams showing time relation between the deflection voltage of the electrostatic deflection plate pair and an ink drop passing therethrough.

Referring to FIG. 12, the time required for an ink drop to pass through the second main electrostatic deflection plate pair 129, 130 is equal to the time $T_1$ required for an ink drop to pass through the first main electrostatic deflection plate pair 111, 112. And the first drop $D_1$ in the dot train $X_1$ undergoes deflection in amount proportional to the black area $Q_a$ of FIG. 12 thereby passing through the first main electrostatic deflection plate pair 111, 112, and then, being delayed by time $T_2$, and the first ink drop $D_1$ enters to the second electrostatic deflection plate pair 129, 130 to undergo the deflection in amount proportional to the same area $Q_a$, thus receiving doubled deflection as compared to the case where the ink drop has passed through only one pair of electrostatic deflection plates. The second drop $D_2$ and the succeeding drops behave in the same manner as the first drop $D_1$. The succeeding drops lag by the time equal to dot by dot, and enter to the electrostatic deflection plate pair 111, 112. The amount of deflection will be determined by the deflection voltage and the passing time $T_1$ to pass through the electrostatic deflection plate pair; hence the deflection of which amount increasing little by little and all being larger than that of the first drop $D_1$, will be given to the drops, so that drops hit the paper at each dot position as shown in FIG. 4. Also, as shown in FIG. 13, with the distance between the electrostatic deflection plate pairs so set that the time $T_3$ required by the drop to pass from the inlet of the first electrostatic deflection plate pair 111, 112 through up to the inlet of the second electrostatic deflection plate pair 129, 130, is equal to the period $T_0$ of the deflection voltage, the phase between the deflection voltages $S_{Y1}$ and $S_{Y2}$ applied to the electrostatic deflection plate pairs may be made equal. Moreover, by setting the time $T_4$ required by the ink drop 102 to pass through all the electrostatic deflection plate pairs 111, 112, 129, 130, to be nearly half of said period $T_0$, the amount of deflection can be made a maximum.

In an embodiment shown in FIG. 1, the printer head 100 has been so designed as to halt its motion while it is printing a letter, numerical figure or sign, and after having printed a letter, moves itself and then comes to a halt to print the next letter, thus repeating such operation. But it is possible to run the printer head continuously at a definite speed in the horizontal direction, i.e., in the sub-deflection direction of the letter, to print the charged ink drops, while the printer head is running. For this purpose, the sub-electrostatic deflection signal $S_X$ in FIG. 2 is maintained at ground level, or the sub-electrostatic deflection plate pair 113, 114 is removed. In short, no deflection is effected in the horizontal direction; printing is performed by moving the printer head 100 in the horizontal direction.

Figure 14:
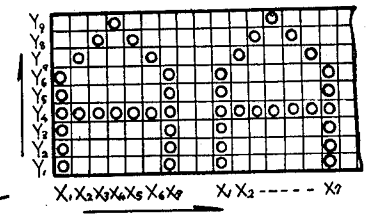
FIG. 14 is a diagram showing an example of the letters printed by the ink-jet printer of this invention.

The embodiment just mentioned is illustrated below with reference to FIGS. 14 and 15.

Figure 15:
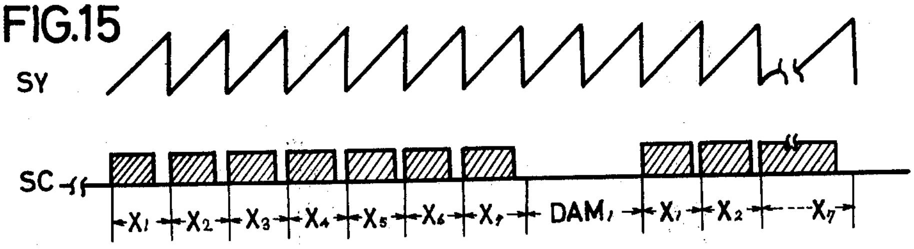
FIG. 15 is a diagram showing an example of the main electrostatic deflection voltage $S_Y$ and the charging voltage Sc in this invention.

FIG. 15 shows the wave form of the charging voltage $S_c$; in this example, one letter has been exemplified to be printed with all dots 7X9. Between the dot train $X_7$ and the next dot train $X_1$ is a dummy period $DAM_1$ where the charging voltage $S_c$ will be maintained at the ground level. In effect, in order to provide a distance between the neighboring letters, a dummy period $DAM_1$, an integer times larger than the period $T_0$ of the main deflection voltage $S_Y$, is inserted so that no charge is given to the ink drops during the dummy period $DAM_1$. Hence such ink drops do not print, and the amount of the printer head 100 movement in the horizontal direction defines a distance between the neighboring letters. Also, by allowing such a continuous transmitting mode to correspond to the receiving operation of a telegraph printer, allowing intermittent transmitting mode to correspond to the transmitting operation, and interchanging the intermittent printing and continuous printing depending on the receiving operation and the transmitting operation, the printed letter received will be of italic form and the printed letter of the transmitting motion will be of straight form, thus enabling quick perception as to whether the letter being printed is that transmitted or received.

According to this invention, dummy period $DAM_1$ between letters can be eliminated to increase the printing speed. For this purpose, the printer head 100 in the set up shown in FIG. 2 is moved continuously, and sub-deflection voltage different from that shown in FIG. 7 is provided. The operation is illustrated below with reference to FIG. 16.

Figure 16:
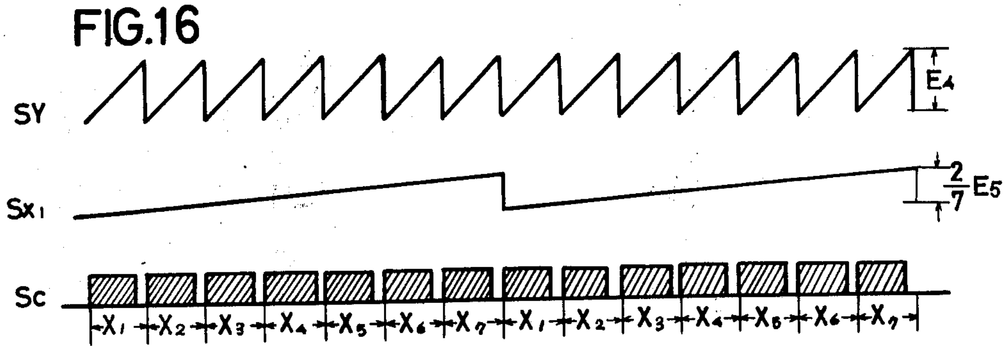
FIG. 16 is a diagram showing the relations among deflection voltages $S_Y$ and $S_X$ applied to the main and sub-electrostatic deflection plate pairs and a charging signal wave form Sc in an embodiment of this invention.

As shown in FIG. 16, $S_{xl}$ represents a sub-deflection voltage that will be applied to the sub-electrostatic deflection plate pair 113, 114, and has the amplitude 2/7 times that of the deflection voltage $S_X$ shown in FIG. 7 and a period 7 times longer than that of the main deflection voltage $S_Y$. At the moment when a letter is just printed and the next letter is to be just printed, the deflection in the horizontal direction starts to be reduced into an amplitude $2/7 \times E_5$, and is represented as a space between letters on the printing paper 400.

Next, correcting the distortion of printed letters is illustrated below.

Figure 17:
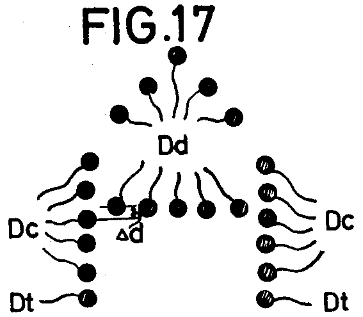
FIG. 17 is a diagram showing an example of the letters printed by an embodiment of this invention.
Figure 19:
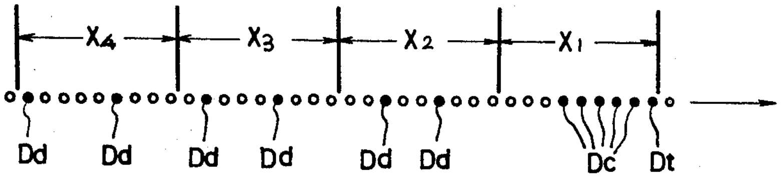
FIG. 19 is a diagram showing an example of charging the ink drop where an alphabet A is being printed by the ink-jet printer of this invention.

Now, for example, if the printing is carried out with the setup shown in FIG. 2, there tends to develop distortion as shown in FIG. 17. Comparing now the case in which charged ink drops are running in succession (see ink drops $D_t$ and $D_c$) with the case in which a charged ink drop is preceded and followed by uncharged drops (see ink drop $D_d$) as shown in FIG. 19, the positions on the printing paper tend to be different by about a half dot line $\Delta d$.

Figure 18:
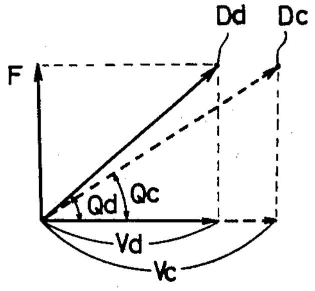
FIG. 18 is a diagram to illustrate the cause of developing letter distortion shown in FIG. 17.

FIG. 18 is a vector diagram to show the cause for distortion. A single drop $D_d$ receives pneumatic resistance greater than that which the succeeding drops $D_c$ will receive; hence the speed of a single drop $D_d$ tends to be lowered compared to the speed of succeeding drops $D_c$. Here, since the deflection force F is supposed to be constant, the deflection angle $\theta_d$ of a single drop $D_d$ will become larger than the deflection angle $\theta_c$ of the succeeding drops $D_c$. For example, where a letter pattern shown in FIG. 14 is being printed, the succeeding drops $D_c$ — with a single drop $D_d$ as a reference — will be recorded on somewhat lower positions than the dot positions of a standard pattern, so that the printed letter will be as shown in FIG. 17. Taking only the above assumption into consideration, the first or preceding drop $D_t$ of a train of ink drops would be affected in the same way as in the case of a single drop $D_d$. But with the first or preceding drop $D_t$ of a drop train being subjected to larger pneumatic resistance so that the distance between it and the following drop $D_c$ will be shortened, the coulomb force will presumably act between the two drops to an appreciable degree. Consequently, the first drop $D_t$ will be repelled and will be printed onto the lower position like the succeeding drops $D_c$.

Such a distortion can be corrected by shifting the timing of an ink drop charging depending on the patterns of letters.

Figure 20:
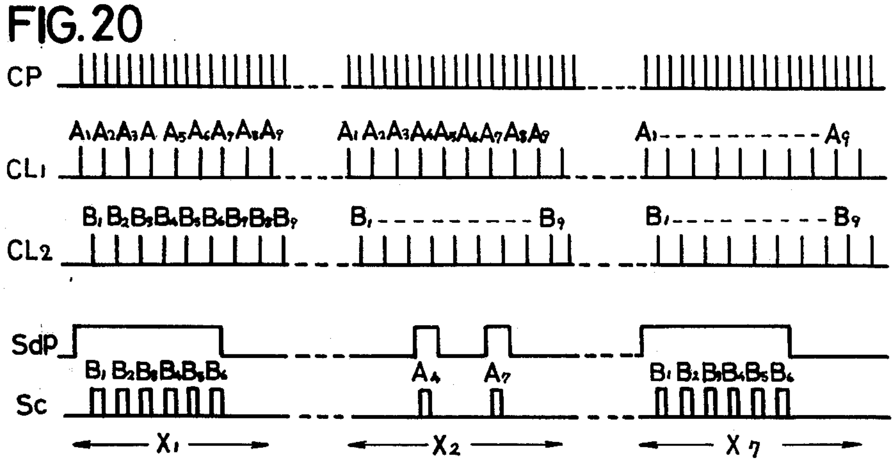
FIG. 20 is a diagram showing an example of the wave forms at each portion of the ink-jet printer of this invention.

Referring to FIG. 20, every other clock pulse CP was recovered to constitute two-phase clock pulses $CL_1$ and $CL_2$. The phase difference between the two phases is equal to one cycle of a clock pulse CP which determines the period of ink drop formation, and the two-phase clock pulses $CL_1$ and $CL_2$ determine the timing of charging. $S_{dp}$ in FIG. 20 represents series letter-pattern signals; a 1-bit pulse width covers two cycles of clock pulses CP, i.e., the time between a clock pulse $CL_1$ and a clock pulse $CL_2$ of two phase. The charging voltage $S_c$ is boosted to a determined charging voltage $E_1$ only when a clock pulse $CL_1$ or $CL_2$ determines the timing of charging ink-drop train, and normally stays at a ground level $E_2$. In short, the charging voltage $S_c$ is determined by an ordinary logical circuit in terms of whether the dots of a letter pattern in the main scanning direction are present continuously or discontinuously by successive or non-successive deposition of charged ink drops, respectively. Where such dots are present continuously the clock pulse $CL_2$ determines the timing of producing the charging voltage, and where such dots are present discontinuously, the clock pulse $CL_1$ determines the same.

For example, referring to letter A, the first dot train $X_1$ constitutes continuous dots, and the ink drops are charged by the timing of pulses $B_1$–$B_6$ in the clock pulse $CL_2$, while the second dot train $X_2$ constitutes discontinuous dots; hence ink drops are charged by pulses $A_4$ and $A_7$ in the clock pulse $CL_1$.

Figure 21:
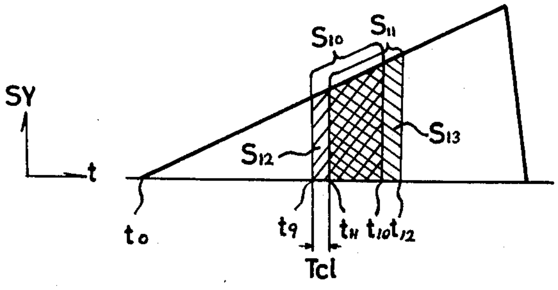
FIG. 21 is a diagram showing an example of time relation between the deflection voltage wave form $S_Y$ applied to the main electrostatic deflection plate pair and the time at which the ink drop is passing through the main electrostatic deflection plate pair, in the ink-jet printer of this invention.

Referring to FIG. 21, if now it is assumed that the drop corresponding to the pulse $A_4$ in the clock pulse $CL_1$ has entered the deflection region at time $t_9$ and come out the deflection region at time $t_{10}$, the drop corresponding to the pulse $B_4$ in the clock pulse $CL_2$ will have to pass through the deflection region at the time between $t_{11}$ and $t_{12}$ being deviated by $T_{cl}$ as a whole. In effect, the former receives the deflection force proportional to the area $S_{10}$ defined by time $t_9$–$t_{10}$ and the saw-tooth wave $S_Y$, and the latter receives the deflection force proportional to the area $S_{11}$ defined by the time $t_{11}$–$t_{12}$ and the saw-tooth wave $S_Y$, thus creating a difference in deflection force corresponding to the difference between the area $S_{12}$ and the area $S_{13}$. The difference $2(S_{13}-S_{12})$ deflection force corresponds to one dot of a letter pattern. Hence by referring to the instance where the drop is charged by the timing of clock pulse $CL_1$ and to the instance where the drop is charged by the timing of the clock pulse $CL_2$, the printing position in the former instance will be lower by a half dot than that of the latter instance.

Also, where it is intended to effect correction with high precision, a multi-phased clock pulse group may be obtained from the clock pulses CP according to the required precision; one phase among such multi-phase may be used for charging the drops to form discontinuous dots, and the other clock pulses may be used for charging the drops which form continuous dots.

In the foregoing embodiments, the main scanning direction was all taken in the vertical direction and the sub-scanning direction in the horizontal direction. But in the case of intermittent recording, the horizontal direction may be taken into the main scanning direction and the vertical direction into the sub-scanning direction.

Also in the foregoing embodiments, the sub-deflection voltage $S_X$ was a saw-tooth wave. But as a wave form of the sub-deflection voltage, those which assume a step-like wave form of which voltage changing step by step for every cycle of the main deflection voltage and which returns to the ground level with the finish of the letter printing, may be used. By doing so, the printing will be effected with erected letters and not sloping letters shown in FIG. 14.

The foregoing embodiments employed saw-tooth waves for the main deflection voltage $S_Y$; but a rectangular wave having about 50% duty ratio may be used for this purpose. By employing a rectangular wave voltage, the amount of deflection can be doubled with the same peak value as that of the saw-tooth wave. In such a case, no ink drops will have common deflection value to pass over the ink-drop capturing means, and the ground level of said wave will have to be raised to some potential level.

What is claimed is:

1. Compensation means for a printing apparatus which prints symbols formed by electrically charged ink dots deposited on a printing medium, said charged ink dots selectively being deflected to form said symbols, said printing apparatus comprising a nozzle means to supply ink to form an ink stream which is ejected onto said printing medium, means for splitting said ink stream into ink drops of uniform size having an equal spacing therebetween, charging means receiving voltage for charging said ink drops, at least a pair of main electrostatic deflection plates receiving a periodic voltage to deflect said charged ink drops in a main scanning direction, said symbol being formed by said ink drops selectively successively or non-successively being deposited as said ink drops are deflected in said main scanning direction and means for controlling said voltage applied to said charging means for forming the printed symbols, wherein the improvement comprises means for controlling the time when said voltage is applied to said charging means in response to the successive or non-successive deposition of adjacent ink drops.

2. Compensation means for a printing apparatus as in claim 1, wherein the improvement comprises means for forming two sets of clock pulses having equal pulse periods and being phase displaced with respect to each other, one of said sets of clock pulses being used to charge said ink drops when successive deposition occurs and the other of said sets of clock pulses being used to charge said ink drops when non-successive deposition occurs.

3. Compensation means for a printing apparatus as in claim 2, wherein each of said ink drops is formed in an ink drop forming period of time, said two sets of clock pulses being phase displaced with respect to each other by a time period equal to half said ink drop forming period of time.

4. Compensation means for a printing apparatus as in claim 3, wherein a train of successive drops is charged later in time than non-successive drops by a period of time equal to half of said ink drop forming period of time.

5. Compensation means for a printing apparatus as in claim 1, wherein each of said ink drops is formed in an ink drop forming period of time, comprising means to operate a multiphase clock pulse to produce m number of separate pulses within said ink drop forming period of time, wherein a train of successive drops is charged at one time and non-successive drops are charged at a later time than said one time within said ink drop forming period of time, the time difference between said later time and said one time being equal to $(n/m) \times$ ink drop forming period of time where $m>2$ and $n<m$.

* * * * *